US007246977B1

(12) United States Patent
Chuang

(10) Patent No.: US 7,246,977 B1
(45) Date of Patent: Jul. 24, 2007

(54) INDICATING DEVICE WITH LARGE GRADUATIONS FOR A PLANE

(76) Inventor: Bor-Yann Chuang, No. 78, Yungfeng Rd., Taiping City, Taichung (TW) 411

( * ) Notice: Subject to any disclaimer, the term of this patent is extended or adjusted under 35 U.S.C. 154(b) by 0 days.

(21) Appl. No.: 11/518,422

(22) Filed: Sep. 11, 2006

(51) Int. Cl.
*B23D 7/08* (2006.01)
*B27C 1/00* (2006.01)
*B27C 1/12* (2006.01)
*B27C 1/14* (2006.01)

(52) U.S. Cl. .................. 409/344; 144/129; 144/117.1; 33/710; 33/772; 33/792

(58) Field of Classification Search ................ 409/344, 409/317, 321–324, 337, 343; 144/129, 130, 144/117.1, 253.8; 33/709, 772, 792, 803, 33/626, 628, 633, 710
See application file for complete search history.

(56) References Cited

U.S. PATENT DOCUMENTS 705,540 A * 7/1902 Myrick ....................... 144/129
2,575,250 A * 11/1951 Copp ...................... 144/253.1
2,804,107 A * 8/1957 Taylor ........................ 144/129
2,881,527 A * 4/1959 Walter et al. ................. 33/710
2,960,125 A * 11/1960 Erickson et al. ............ 144/129
3,171,454 A * 3/1965 Boice ......................... 144/129
5,533,557 A * 7/1996 Jedlicka et al. .......... 144/253.8
5,979,521 A * 11/1999 Garcia ........................ 144/129
6,494,239 B1* 12/2002 Liao ........................... 144/129
6,513,557 B1* 2/2003 Chuang ...................... 144/129

* cited by examiner

*Primary Examiner*—Erica Cadugan
(74) *Attorney, Agent, or Firm*—Troxell Law Office, PLLC

(57) ABSTRACT

An indicating device with large graduations for a plane is installed at a combining section of a main base and a worktable of the plane, including a graduation ruler, a pointer and a rack. The graduation ruler formed as an arc is provided with graduations with number figures for readings. The upper end portion of the pointer faces exactly to the graduation ruler for pointing to one of the graduations. The pointer has gear teeth in its lower round edge for engaging with gear teeth located on one side of the rack. Therefore, a displacement the worktable moves relative to the main base can be clearly and easily read from the graduations of the graduation ruler.

6 Claims, 5 Drawing Sheets

INDICATING DEVICE WITH LARGE GRADUATIONS FOR A PLANE

BACKGROUND OF THE INVENTION

1. Field of the Invention

This invention relates to a plane, particularly to one having an indicating device with large graduations for reading clearly.

2. Description of the Prior Art

Commonly, as shown in FIG. 1, a conventional plane 1 consists of a main base 10, a movable worktable 20 able to be adjusted upward or downward and a graduation indicator 30 employed to display a displacement that the movable worktable 20 moves against the main base 10 correspondingly. The graduation indicator 30 is composed of a graduation ruler 31 and a pointer 32. The graduation ruler 31 set fixedly on the main base 10 is provided with graduations 311. The pointer 32 fixed on the movable worktable 20 is provided with an indicating tip 321 at its one end facing against the graduation ruler 31, able to move a distance corresponding to that of the movable worktable 20 moving against the main base 10 to serve a purpose of indicating graduations.

But, the length of the graduation ruler 31 is equivalent to the vertical displacement of the movable worktable 20 relative to the main base 10. But the gaps of the graduations are usually very little, it is very hard to clearly recognize graduations on the graduation ruler 31.

SUMMARY OF THE INVENTION

The objective of this invention is to offer an indicating device with large graduations for a plane.

The main characteristics of the invention are a graduation ruler, a pointer and a rack. The invention is installed at a combining section of a main base and a worktable of the plane. The graduation ruler formed as an arc is provided with graduations on its surface written with number figures for reading. The upper end portion of the pointer faces exactly to the graduation ruler for pointing to the graduations. The pointer has gear teeth in its round edge for engaging with gear teeth located on one side of the rack. Therefore, the pointer is able to move according to a displacement the worktable moves relative to the main base. As the real displacement of the worktable is virtually magnified by the ark shape of the rack to keep graduation gaps widened on the arc of the graduation ruler, the graduation pointed by the pointer can be recognized easily.

BRIEF DESCRIPTION OF DRAWINGS

This invention is better understood by referring to the accompanying drawings, wherein.

DETAILED DESCRIPTION OF THE PREFERRED EMBODIMENT

Figure 1:
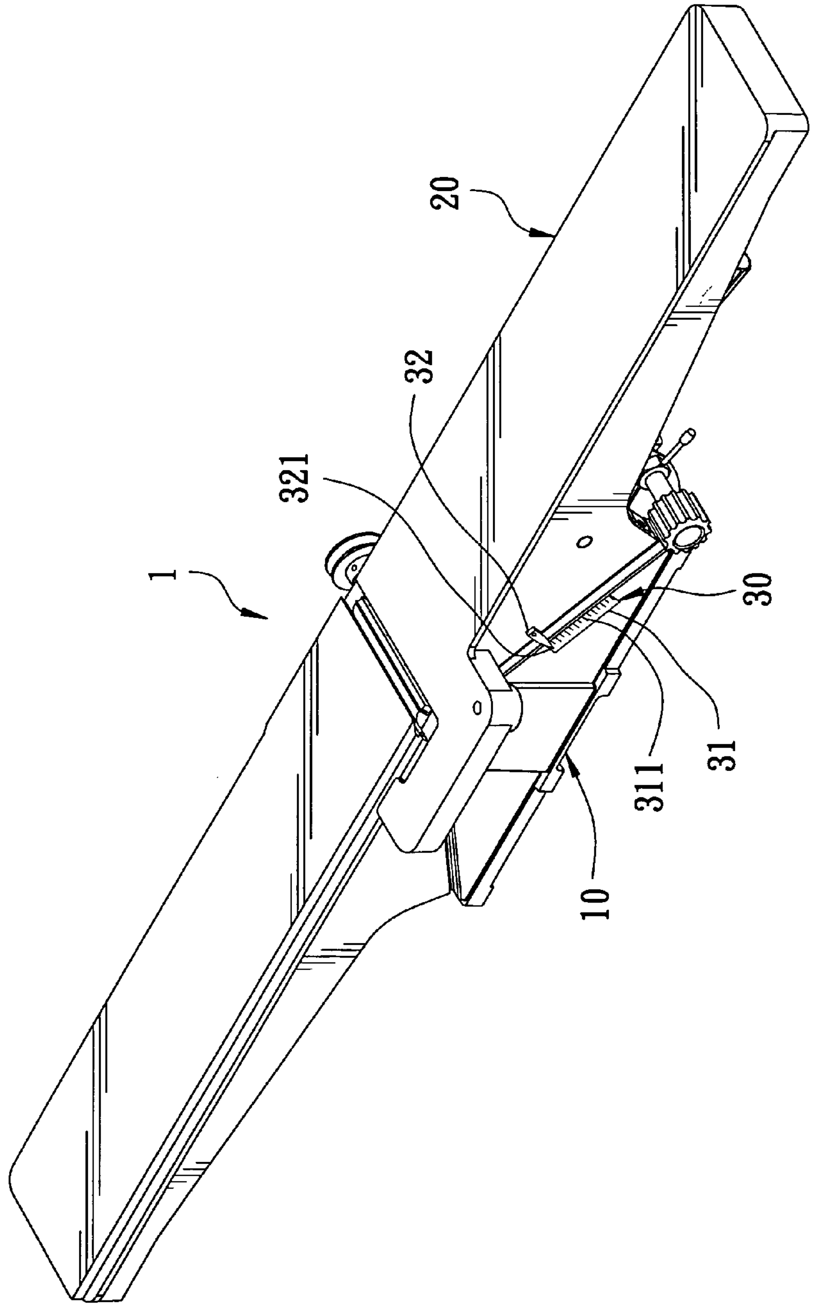
FIG. 1 PRIOR ART
FIG. 1 is a perspective view of a conventional graduation indicating device for a plane.
Figure 2:
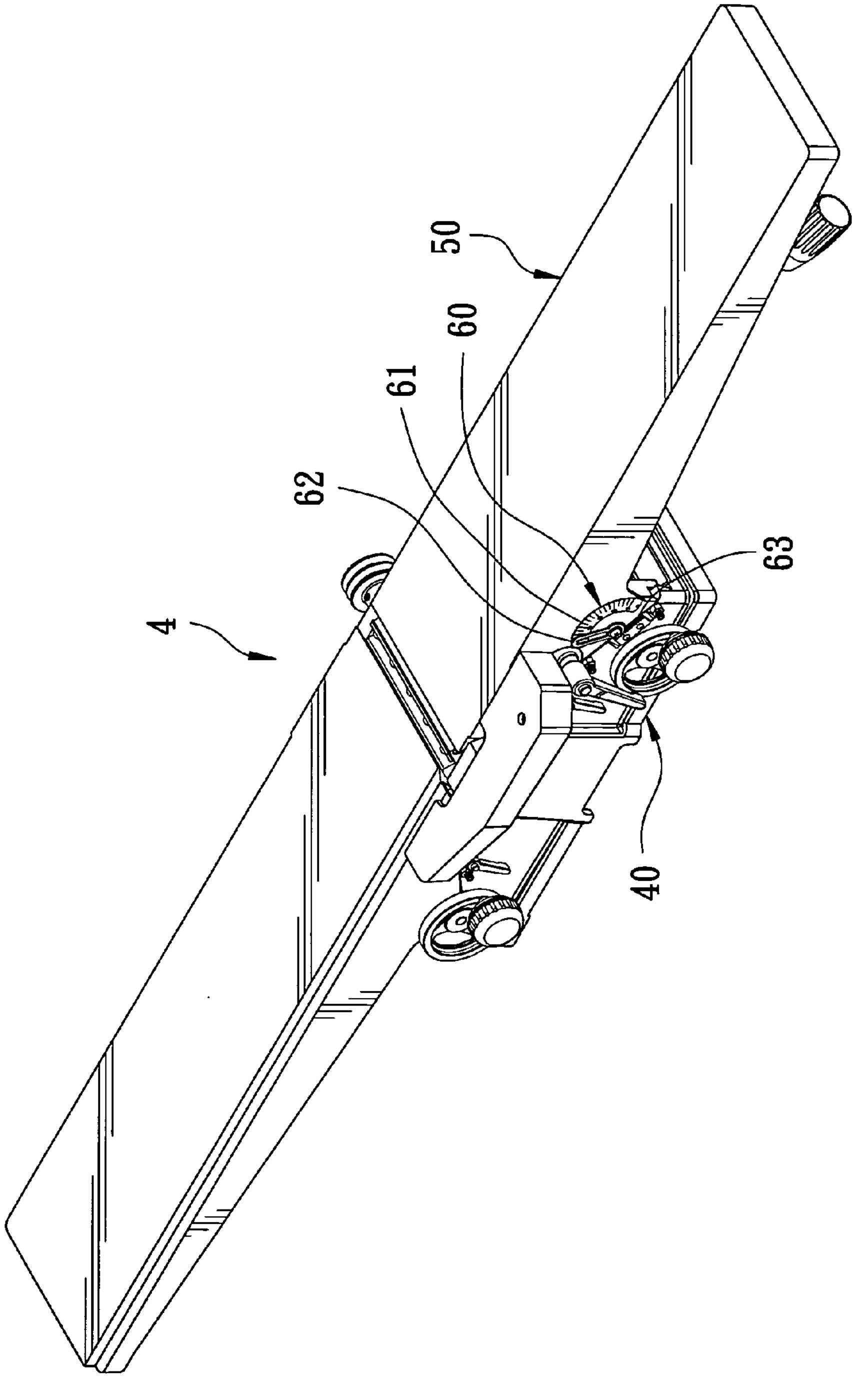
FIG. 2 is a perspective view of a preferred embodiment of an indicating device with large graduations for a plane in the present invention.
Figure 3:
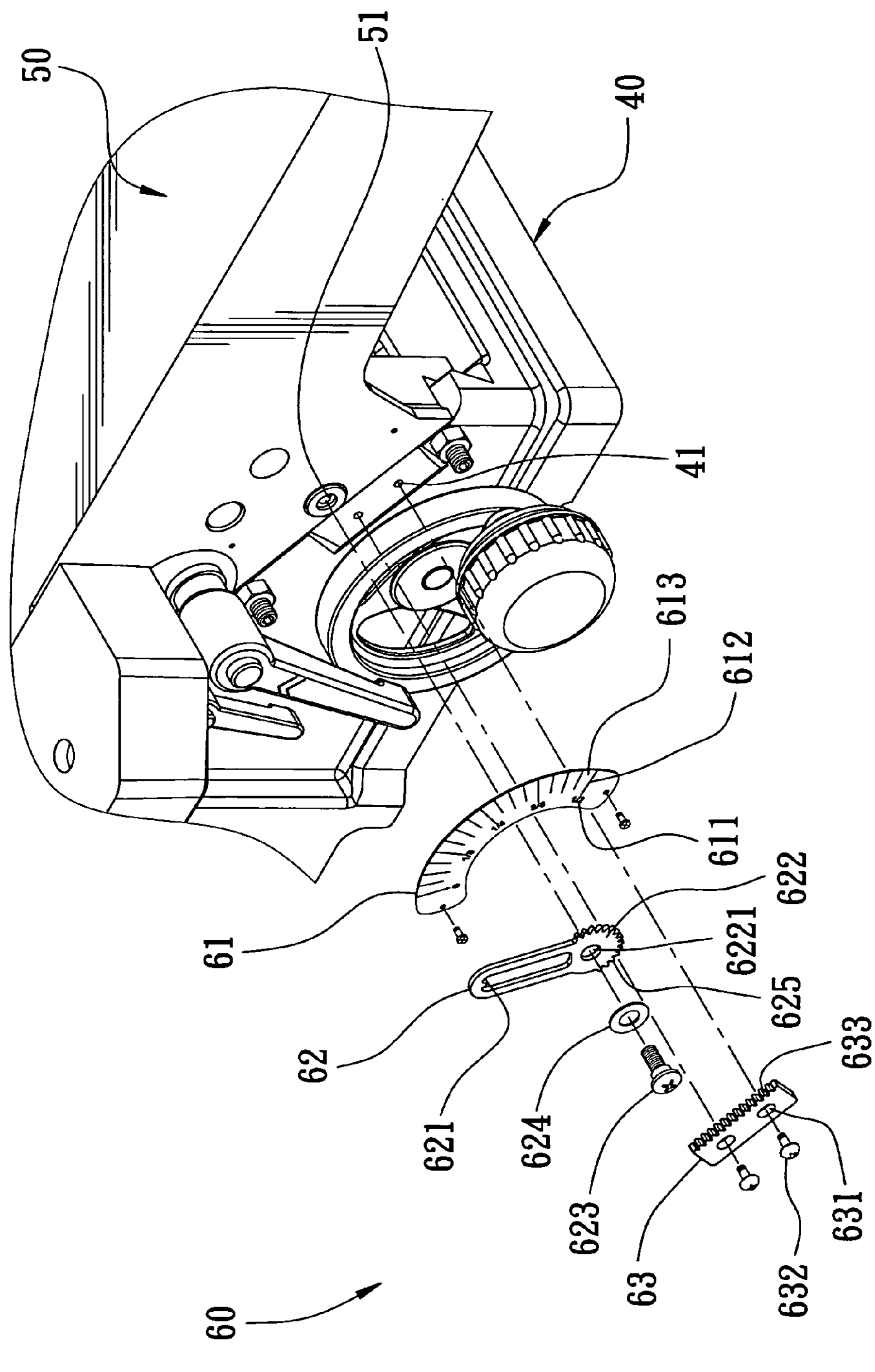
FIG. 3 is a partial exploded perspective view of the preferred embodiment of an indicating device with large graduations for a plane in the present invention.

FIGS. 2 and 3 show a preferred embodiment of an indicating device with large graduations for a plane 4 in the present invention. The plane 4 includes a main base 40, a movable worktable 50 and an indicating device 60 with large graduations installed at a combining section of the main base 40 and the movable worktable 50. The indicating device 60 is provided with a graduation ruler 61, a pointer 62 and a rack 63. The pointer 62 is employed to move against the graduation ruler 61 to point to a graduation according to a displacement the movable worktable 50 moves against the main base 40.

The graduation ruler 61 formed as an arc is fixed on the main base 40 to face against the upper end portion of the pointer 62 and provided with continuous number figures 611 for graduations 612. There is a graduation gap 613 between every two adjacent graduations 612.

The pointer 62 set at the top of the combining section of the main base 40 and the movable worktable 50 is formed as a strip having its two ends shaped round. The pointer 62 is provided with an indicating peak 621 in its upper end portion facing exactly to the graduations 612 for pointing to one of the graduations 612 and a pivotal portion 622 in its lower portion. The pointer 62 is fixed with a screw hole 51 of the worktable 50 by a screw 623 that penetrates pivotally through a washer 624 and a penetrating hole 6221 of the pivotal portion 622 first. Gear teeth 625 are formed around the outer edge of the pivotal portion 622.

The rack 63 is provided with two spaced-apart holes 631 for two screws 632 to pass through respectively to screw fixedly in two screw holes 41 of the main base 40 under said combining section of the main base 40 and the movable worktable 50. The rack 63 is additionally provided with gear teeth 633 in one side for engaging with the gear teeth 625 of the pointer 62.

Figure 4:
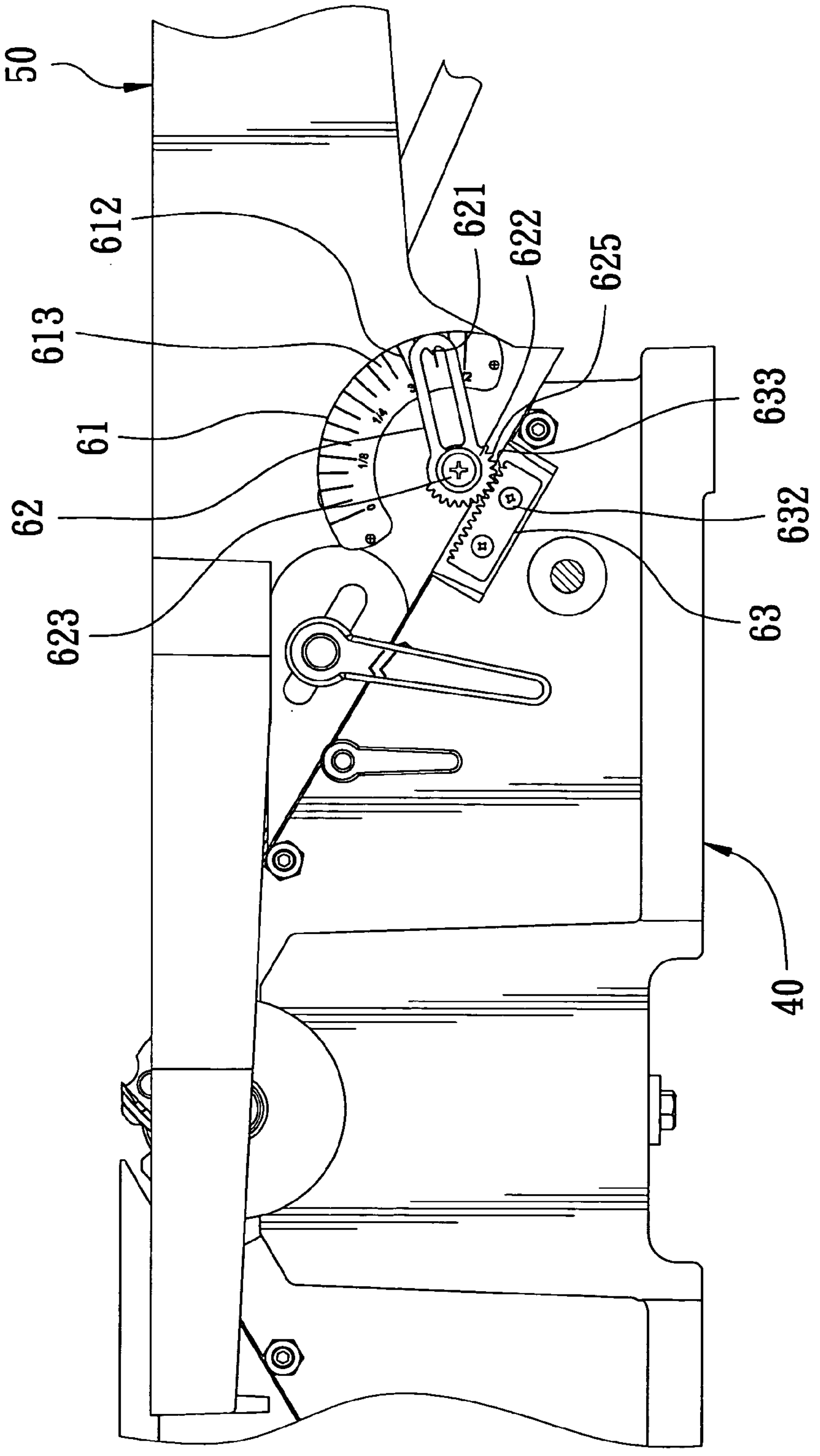
FIG. 4 is a front view of the preferred embodiment of an indicating device with large graduations for a plane in the present invention, showing it being moving down.
Figure 5:
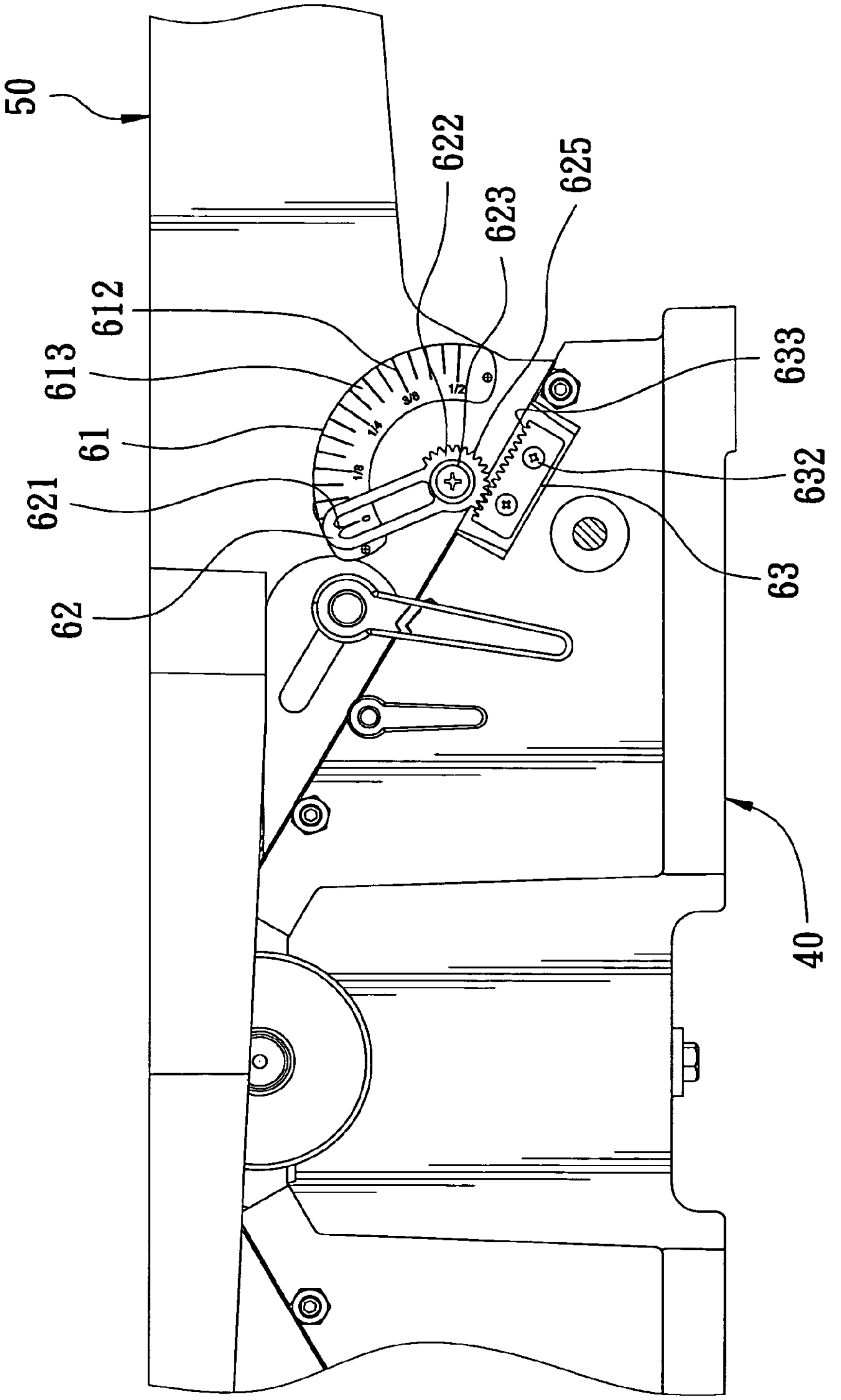
FIG. 5 is a front view of the preferred embodiment of an indicating device with large graduations for a plane in the present invention, showing it being moving up.

As shown in FIGS. 3 and 4, when the movable worktable 50 moves down relative to the main base 40, the graduation ruler 61 and the pointer 62 are to be driven to move down simultaneously. By the time, the pointer 62 engaged with the gear teeth 633 of the rack 63 by the gear teeth 625 is to rotate rightwards with the pivotal portion 622 functioning as a pivot, so as to display a displacement the worktable 50 moves down relative to the main base 40. On the contrary, as shown in FIG. 5, when the movable worktable 50 moves up relative to the main base 40, the pointer 62, with the pivotal portion 622 functioning as a pivot is to rotate leftwards so as to display a displacement the worktable 50 moves up relative to the main base 40. It should be noted that a real displacement the worktable 50 moves relative to the main base 40 is virtually magnified by the ark shape of the graduation ruler 61, so that the graduation gaps 613 between every two adjacent graduations 612 on the arc of the scale ruler 61 is widened, easy for a user to read the graduations clearly.

As can be seen from the foresaid description, the greatest advantage the invention has is that the a real displacement the worktable 50 moves relative to the main base 40 is virtually magnified by the ark shape of the graduation ruler, so that the graduation gaps 613 widened to enable a user to read the graduations clearly.

While the preferred embodiment of the invention has been described above, it will be recognized and understood that various modifications may be made therein and the appended claims are intended to cover all such modifications that may fall within the spirit and scope of the invention.

What is claimed is:

1. An indicating device with large graduations for a plane, said plane including a main base and a movable worktable adjustable to move up or down, said indicating device installed at a combining section of said main base and said movable worktable for displaying a displacement said movable worktable moves relative to the main base, said indicating device comprising:

a graduation ruler formed as an arc and fixed to face against the upper end portion of a pointer and provided with number figures for graduations;

said pointer screwed at the top of said combining section of said main base and said movable worktable to face against said graduation ruler with its upper end portion for pointing to one of said graduations and provided with gear teeth around its lower round edge; and a rack screwed fixedly under said combining section of said main base and said movable worktable and provided with gear teeth in an upper side for engaging with said gear teeth of said pointer.

2. An indicating device with large graduations for a plane as claimed in claim 1, wherein said graduation ruler has a large gap between every two of said graduations.

3. An indicating device with large graduations for a plane as claimed in claim 1, wherein said number figures of said graduation ruler are continuous.

4. An indicating device with large graduations for a plane as claimed in claim 1, wherein said pointer is formed as a strip having its two ends shaped round, provided with an indicating peak in its upper end portion and a pivotal portion in its lower portion.

5. An indicating device with large graduations for a plane as claimed in claim 4, wherein said pointer is screwed fixedly on said worktable by means of a screw passing through said pivotal portion.

6. An indicating device with large graduations for a plane as claimed in claim 1, wherein said rack is provided with two spaced-apart holes for screws to pass through to screw fixedly on said main base.

* * * * *